ature Patent [19]

United States Patent [19]

Shiga et al.

[11] Patent Number: 4,645,808

[45] Date of Patent: * Feb. 24, 1987

[54] PROCESS FOR PRODUCING OLEFIN POLYMER

[75] Inventors: Akinobu Shiga, Koganei; Toshio Sasaki; Junpei Kojima, both of Ichihara, all of Japan

[73] Assignee: Sumitomo Chemical Company, Limited, Osaka, Japan

[*] Notice: The portion of the term of this patent subsequent to Aug. 6, 2002 has been disclaimed.

[21] Appl. No.: 725,499

[22] Filed: Apr. 22, 1985

[30] Foreign Application Priority Data

Apr. 26, 1984 [JP] Japan .................................. 59-85597

[51] Int. Cl.[4] .......................... C08F 4/64; C08F 10/00
[52] U.S. Cl. ..................................... 526/119; 502/129; 526/351; 526/348; 526/904
[58] Field of Search .......................................... 526/119

[56] References Cited

U.S. PATENT DOCUMENTS

| | | | |
|---|---|---|---|
| 3,773,735 | 11/1973 | Diedrich et al. | 526/159 |
| 4,295,991 | 10/1981 | Wristers | 526/119 |
| 4,420,593 | 12/1983 | Sato et al. | 526/142 |
| 4,533,706 | 8/1985 | Shiga et al. | 526/119 |

*Primary Examiner*—Edward J. Smith
*Attorney, Agent, or Firm*—Stevens, Davis, Miller & Mosher

[57] ABSTRACT

A process for producing an olefin polymer which comprises the homopolymerizing or copolymerizing an olefin in the presence of a catalyst system composed of an organoaluminum compound and a hydrocarbyloxy group-containing solid catalyst component which is prepared by reducing a titanium compound represented by the general formula $Ti(OR^1)_n X_{4-n}$, wherein $R^1$ is a $C_1$–$C_{20}$ hydrocarbon radical, X is halogen, and n is a number defined as $0 < n \leq 4$, with an organoaluminum compound represented by the general formula $AlR^2_m Y_{3-m}$, wherein $R^2$ is a $C_1$–$C_{20}$ hydrocarbon radical, Y is halogen, and m is a number defined as $1 \leq m \leq 3$, subjecting the reduction product, which is a hydrocarbyloxy group-containing solid insoluble in hydrocarbon solvents, to a preliminary ethylene polymerization treatment, and treating the resultant solid in a state of slurry in a hydrocarbon solvent with an ether compound and titanium tetrachloride at a temperature of 30° to 100° C.

9 Claims, No Drawings

PROCESS FOR PRODUCING OLEFIN POLYMER

BACKGROUND OF THE INVENTION

1. Field of the Invention

The present invention relates to a process for producing an olefin polymer.

2. Description of the Prior Art

It is well known that olefin polymers are produced generally by using a so-called ziegler-Natta catalyst comprising a transition metal compound of groups IV to VI and either a metal or an organometallic compound of groups I to III. In particular, titanium trichloride compositions are used for industrial productions of polyolefins such as polypropylene, polybutene-1, etc. In such a production process, however, an amorphous polymer is produced incidentally to a highly stereoregular olefin polymer of great value for industrial utilization.

This amorphous polymer is of little value for industrial utilization and has much detrimental effect on mechanical properties of the films, fibers, and other processed articles resulting from the olefin polymer, when contained therein in considerable amounts.

The formation of the amorphous polymer means a loss of the feed monomer and requires an additional production facility in order to remove the amorphous polymer, thus bringing about very significant disadvantages also in the industrial aspect.

Consequently, when such an amorphous polymer is not formed at all or is little if any, it will be of very great advantage.

On the other hand, the olefin polymer produced in the above polymerization process contains catalyst residue, which causes problems in the stability, processability, etc. of the olefin polymer. Therefore, facilities are necessary in order to remove the catalyst residue and stabilize the polymer.

This drawback will be removed by increasing the catalyst activity represented by the weight of the olefin polymer produced per unit weight of the catalyst. If the catalyst activity is increased to a great extent, the facility for removing the catalyst residue will be unnecessary and the reduction of the polymer production cost will be possible as well.

Methods for producing titanium trichloride include processes comprising the reduction of titanium tetrachloride (1) with hydrogen, followed by grinding the reduction product in a ball mill to activate it, (2) with metallic aluminum, followed by the same activation as above, and (3) with an organoaluminum compound at a temperature of $-30°$ to $+30°$, followed by the heat treatment of the reduction product at a temperature of $120°$ to $180°$ C. These processes, however, are unsatisfactory in both the catalytic activity and the stereospecificity of the product titanium trichloride.

Further, the following processes have been proposed for producing titanium trichloride: A process comprising treating the solid resulting from the reduction of titanium tetrachloride with an organoaluminum compound, with a complexing agent, followed by reacting the resultant solid with titanium tetrachloride (Japanese Patent Publication No. 3356/78). A process comprising treating the above-mentioned solid reduction product with a complexing agent and titanium tetrachloride (Japanese Patent Publication No. 3480/79). A process comprising reducing an alkoxy group-containing titanium compound with an organoaluminum compound in the presence of an ether compound, and adding titanium tetrachloride and an ether compound to the reaction mixture to form a liquid state titanium compound, followed by heating the compound to reprecipitate a titanium compound (Japanese Patent Application Kokai (Laid-Open) Nos. 18608/81 and 20002/81).

The present inventors, as a result of intensive studies of hydrocarbyloxy group-containing titanium compounds, found that a catalyst system composed of an organo aluminum compound and the following solid catalyst component exhibits a high catalytic activity and gives a highly stereospecific olefin polymer (Japanese Patent Application Kokai (Laid-open) No. 126,402/84). That is, the solid catalyst component containing hydrocarbyloxy groups is prepared by reducing a titanium compound represented by the general formula $Ti(OR^1)_nX_{4-n}$ with an organoaluminum compound, followed by treating the resultant solid with an ether compound and titanium tetrachloride.

According to this method, however, particles of the solid reduction product of the titanium compound represented by the formula $Ti(OR^1)_nX_{4-n}$ disintegrate partially into fine particles during the activation treatment with an ether compound and titanium tetrachloride. In the methods disclosed in Japanese Patent Application Kokai (Laid-Open) Nos. 18608/81 and 20002/81, considerable amounts of fine particles are formed in the solid catalysts since a liquid state titanium compound is once prepared. Accordingly, blocks are formed during the drying of the solid catalyst after washing. When the block-containing solid catalyst is used as such for olefin polymerization, clogging is liable to occur in the solid catalyst feed line and particles of the polymer in the polymerization reactor tend to aggregate into blocks, which may clog the polymer discharge valve. Therefore, the screening of the solid catalyst is necessary in order to remove the blocks.

SUMMARY OF THE INVENTION

For the purpose of preventing the disintegration of catalyst particles in the activation treatment, the present inventors made intensive studies, and as a result found that a highly active catalyst giving a highly stereospecific olefin polymer results from a hydrocarbyloxy group-containing solid catalyst component which is prepared by reducing a titanium compound represented by the general formula $Ti(OR^1)_nX_{4-n}$ with an organoaluminum compound, and subjecting the resulting solid product to a preliminary ethylene polymerization treatment, followed by treatment of the resultant solid with an ether compound and titanium tetrachloride. Based on this finding, the present invention has been accomplished.

Thus, the present invention relates to a process for producing an olefin polymer which comprises homopolymerizing or copolymerizing an olefin in the presence of a catalyst system composed of an organoaluminum compound and a hydrocarbyloxy group-containing solid catalyst component which is prepared by reducing a titanium compound represented by the general formula $Ti(OR^1)_nX_{4-n}$, wherein $R^1$ is a $C_1$-$C_{20}$ hydrocarbon radical, X is halogen, and n is a number defined as $0<n\leq 4$, with an organoaluminum compound represented by the general formula $AlR^2_mY_{3-m}$, wherein $R^2$ is a $C_1$-$C_{20}$ hydrocarbon radical, Y is halogen, and m is a number defined as $1\leq m\leq 3$, subjecting the reduction product which is a hydrocarbyloxy group-containing solid insoluble in hydrocarbon solvents to a preliminary ethylene polymerization treatment, and treating the resultant solid in a state of slurry in a hydrocarbon solvent with an ether compound and titanium tetrachloride at a temperature of 30° to 100° C.

According to the present invention, a highly active and highly stereospecific catalyst for olefin polymerization is obtained, the solid component of which has good particle characteristics, that is, contains few fine particles and few coarse particles. Hence, the catalyst of the present invention is characterized by offering an olefin polymer good in particle characteristics, being free of fine or coarse particles.

Generally an electron donative compound is added to an olefin polymerization system for the purpose of improving the stereospecificity of the olefin polymer. While the catalytic activity is generally deteriorated in such a case, the deterioration scarcely occurs when the solid catalyst component of the present invention is used. This is another characteristic of the catalyst according to the present invention.

DETAILED DESCRIPTION OF THE INVENTION

In the titanium compounds, used in the present invention, represented by the general formula $Ti(OR^1)_nX_{4-n}$ ($R^1$: $C_1$-$C_{20}$ hydrocarbon radicals; X: halogen; $0<n\leq4$), examples of $R^1$ are alkyls including methyl, ethyl, n-propyl iso-rpopyl, n-butyl, isobutyl, n-amyl, isoamyl, n-hexyl, n-heptyl, n-octyl, n-decyl, and n-dodecyl; aryls including phenyl, cresyl, xylyl, and naphthyl; cycloalkyls including cyclohexyl and cyclopentyl; propenyl and allyl; and aralkyl including benzyl. Of these, particularly preferred are linear alkyls of 2 to 18 carbon atoms and aryls of 6 to 18 carbon atoms.

A titanium compound having two or more different $OR^1$ groups can also be used.

Halogen atoms represented by X include, for example, chlorine, bromine, and iodine. Chlorine as X gives specially favorable results.

The titanium compound of the general formula $Ti(OR^1)_nX_{4-n}$ ($0<n\leq4$) can be synthesized by a known method, for instance, by reacting $Ti(OR^1)_4$ with $TiX_4$ in a prescribed ratio or by reacting $TiX_4$ with the corresponding alcohol in a prescribed ratio.

Values of n of the titanium compounds represented by the general formula $Ti(OR^1)_nX_{4-n}$ are defined as $0<n\leq4$, preferably $0.3\leq n\leq4$, more preferably $1\leq n\leq4$, and most preferably $1.5\leq n\leq4$.

Examples of the organoaluminum compounds, for the reduction, represented by the general formula $AlR^2_mY_{3-m}$ ($R^2$: $C_1$-$C_{20}$ hydrocarbon radical; Y: halogen; $1\leq m\leq3$) are ethylaluminum sesquichloride, dimethylaluminum chloride, diethylaluminum chloride, di-n-propylaluminum chloride, trimethylaluminum, triethylaluminum, triisobutylaluminum, ethyldichlorohexylaluminum, triphenylaluminum, diethylaluminum hydride, diisobutylaluminum hydride, diethylaluminum bromide, and diethylaluminum iodide. Of these compounds, diethylaluminum chloride and ethylaluminum sesquichloride give particularly favorable results.

It is desirable to carry out the reduction in an inert hydrocarbon solvent such as pentane, hexane, heptane, octane, decane, toluene, or decalin in which the concentrations of the titanium compound and of the organoaluminum compound are each from 10 to 70% by weight.

The reduction is carried out at a temperature of $-10°$ to 80° C., preferably 10° to 70° C., for a period usually of 1 to 6 hours, though the reaction period is not particularly restricted.

The molar ratio of the organoaluminum compound to the titanium compound in the reduction is freely varied according to the application purpose of the product olefin polymer. The molar ratios for favorable results are 0.5:1 to 1.5:1 in the case of diethylaluminum chloride and 1.5:1 to 2.5:1 in the case of ethylaluminum sesquichloride.

After completion of the reduction, an additional reaction also may be conducted at a temperature of 30° to 100° C.

Hydrocarbyloxy group contents in the solid product obtained by reduction insoluble in hydrocarbon solvents are 0.3 to 2.5 moles, preferably 0.4 to 2.0 moles, particularly preferably 0.6 to 1.8 moles, per mole of titanium atoms contained in the solid product.

The wide-angle X-ray diffraction pattern of this solid product taken by using the X-ray Cu-K$\alpha$ shows no peak characteristic of titanium trichloride crystal in the 2$\Theta$ range of 10° to 60°, proving that the product is amorphous.

When the hydrocarbyloxy group content in this solid product is less than the above defined lower limit, the resulting solid catalyst component is unsatisfactory in catalytic activity and stereospecificity. On the contrary, when the content exceeds the upper limit, the resulting solid catalyst component is inferior in particle characteristics.

The hydrocarbyloxy group-containing, hydrocarbon-insoluble solid product obtained by the reduction can be subjected, as such without separating from the mother liquid, to a preliminary ethylene polymerization treatment under ordinary polymerization conditions but without adding any organoaluminum compound. Preferably, the preliminary ethylene polymerization treatment of the solid product obtained by reduction is carried out, after it has been separated from the mother liquid and washed several times with an inert liquid hydrocarbon such as pentane, hexane, heptane, octane, decane, toluene, xylene, or decalin. The preliminary polymerization treatment is conducted in the following manner: For example, 10 g of the hydrocarbyloxy group-containing solid product is suspended in 20 to 200 ml of an inert liquid hydrocarbon such as hexane or heptane, 0.1 to 20 g of the same organoaluminum compound (0.1 to 20 g) as used in the main polymerization is added, and ethylene is added and polymerized at a temperature of 20° to 80° C., preferably 25° to 60° C., and a pressure of 0 to 10 Kg/cm$^2$ gage for a period generally of about 5 minutes to 10 hours. Addition of hydrogen for regulating the molecular weight is possible at the preliminary polymerization treatment. The amount of ethylene polymerized in this treatment is in the range of 0.03 to 10 g, preferably 0.08 to 5 g, particularly preferably 0.15 to 3 g, per 1 g of the hydrocarbyloxy group-containing solid product.

The molecular weight of the resulting ethylene polymer expressed in intrinsic viscosity [$\eta$] is preferably at least 1. The solid product of the preliminary polymerization treatment is separated from the liquid, and washed several times with an inert liquid hydrocarbon such as hexane or heptane.

The solid product obtained by the preliminary polymerization treatment (hereinafter referred to as the preliminary polymerization treated solid) is then reacted with an ether compound and titanium tetrachloride in a hydrocarbon solvent.

Suitable ether compounds for this reaction are dialkyl ethers, e.g. diethyl ether, di-n-propyl ether, diisopropyl ether, di-n-butyl ether, di-n-amyl ether, diisoamyl ether, dineopentyl ether, di-n-hexyl ether, di-n-octyl ether, methyl n-butyl ether, methyl isoamyl ether, and ethyl isobutyl ether. Di-n-butyl ether and diisoamyl ether are preferred in particular.

The amount of ether compound used in this reaction is from 0.1 to 5 moles, preferably from 0.3 to 3 moles, per mole of titanium atoms contained in the preliminary polymerization treated solid.

The amount of titanium tetrachloride for use is from 0.1 to 10 moles, preferably from 0.5 to 5 moles, per mole of titanium atoms contained in the preliminary polymerization treated solid, and is from 0.5 to 10 moles, preferably from 1.5 to 5 moles, per mole of the ether compound.

The reaction of the hydrocarbon-insoluble preliminary polymerization treated solid with the ether compound and titanium tetrachloride is carried out in a slurry state.

Suitable liquids as media for this slurry include aliphatic hydrocarbons, e.g. pentane, hexane, heptane, octane, and decane; aromatic hydrocarbons, e.g. toluene, xylene, and decalin; and alicyclic hydrocarbons, e.g. cyclohexane and methylcyclohexane. Of these hydrocarbons, particularly preferred are aliphatic hydrocarbons.

The solid concentration in the slurry is from 0.05 to 0.5 g/cm$^3$, preferably from 0.1 to 0.3 g/cm$^3$.

The reaction is carried out at a temperature of 30° to 100° C., preferably 45° to 90° C., for a period of 30 minutes to 6 hours, though the reaction period is not particularly restricted.

For mixing feed materials for this reaction, either the ether compound and titanium tetrachloride may be added to the preliminary polymerization treated solid or reversely the solid may be added to an ether compound-titanium tetrachloride solution.

In the former addition manner, it is preferred to add titanium tetrachloride after addition of the ether compound or to add the ether compound simultaneously with titanium tetrachloride.

This reaction also may be conducted repeatedly twice or more.

Further the reaction can also be carried out in the presence of an electron donative compound selected from nitrogen-, oxygen-, sulfur-, and/or phosphorus-containing organic compounds.

Representative electron donative compounds for use in this case include; ethers, specially, aromatic ethers e.g. diphenyl ether and anisole; siloxanes, e.g. dimethylsiloxane; thioethers, e.g. butyl sulfide; amines, specially tertiary amines, e.g. trioctylamine; and phosphoric esters, e.g. butyl phosphate.

The amount of the electron donative compound to be used is from $5 \times 10^{-3}$ to 0.5 mole, preferably from $1 \times 10^{-2}$ to 0.1 mole, per mole of titanium atoms contained in the preliminary polymerization treated solid.

The solid catalyst component prepared in the present invention contains hydrocarbyloxy groups in an amount of $5 \times 10^{-4}$ to $2 \times 10^{-1}$ mole, preferably $1 \times 10^{-3}$ to $1.5 \times 10^{-1}$ mole, per mole of titanium atoms contained.

When the content of hydrocarbyloxy groups exceeds the above upper limit, the catalytic activity lowers and the resulting α-olefin polymer has low stereospecificity. On the contrary, when the content of hydrocarbyloxy groups is less than the above lower limit, the catalytic activity is particularly lowered.

The solid catalyst component resulting from the above reaction is separated from the mother liquid, and washed several times with an inert liquid hydrocarbon solvent such as hexane or heptane to use for polymerization.

Suitable organoaluminum compounds for use in olefin polymerization in the present invention are trialkylaluminums, dialkylaluminum hydrides, dialkylaluminum chlorides, dialkylaluminum alkoxides, dialkylaluminum siloxides, and mixtures of these compounds.

Individual examples thereof include dimethylaluminum chloride, diethylaluminum chloride, diisobutylaluminum chloride, diethylaluminum bromide, diethylaluminum iodide, trimethylaluminum, triethylaluminum, triisobutylaluminum, diethylaluminum hydride, diethylaluminum ethoxide, and mixtures of these compounds. In particular, diethylaluminum chloride and mixtures thereof with triethylaluminum are preferred.

The organoaluminum compound can be used in amounts widely ranging as from 0.1 to 500 moles per mole of titanium atoms contained in the hydrocarbyloxy group-containing solid catalyst component. The range of 0.2 to 200 moles is preferable.

A known electron donative compound can be added to the polymerization system so as to increase the stereospecificity of the polymer. Typical examples of such electron donative compounds are esters such as methyl methacrylate, ethyl benzoate, γ-butyrolactone, and ε-caprolactone, and phosphorous acid esters such as triphenyl phosphite and tri-n-butyl phosphite.

The polymerization can be carried out at temperatures ranging from 0° to 300° C. However, polymerization temperatures ranging from 0° to 100° C. are generally preferable in stereospecific polymerization of α-olefin since high stereospecificity cannot be attained at polymerization temperatures above 100° C.

While the polymerization pressure is not particularly restricted, pressures of about 3 to 100 atm. are preferred from the industrial and economical point of view.

The polymerization may be conducted in a continuous or batchwise operation.

Olefins for which the present invention is adaptable are those having 2 to 10 carbon atoms, for example, ethylene, propylene, butene-1, pentene-1, 4-methylpentene-1, and hexene-1. Particularly preferred thereof is propylene.

In the present invention, these olefins can be either homopolymerized or copolymerized.

Copolymerization of two or more of these olefins can be carried out by contacting the olefins in mixture with the catalyst system.

Heteroblock copolymerization, wherein polymerization is carried out in two or more stages, is also possible in the present invention.

The polymerization can be accomplished by any of; the slurry polymerization process using an inert hydrocarbon solvent such as butane, pentane, hexane, heptane, or octane; solution polymerization process comprising polymerization of an olefin in an inert hydrocarbon solvent dissolving the formed olefin polymer; bulk polymerization process comprising polymerization of an olefin in liquified form without using any solvent; and gas phase polymerization process comprising polymerization of an olefin in the gaseous state.

For the purpose of controlling the molecular weight of the polymer, hydrogen or some other chain transfer agent can be added.

The process of the invention is illustrated with reference to the following examples; however, the invention is not to be limited to these examples.

EXAMPLE 1

(A) Preparation of solid product

A 500-ml flask equipped with a stirrer and a dropping funnel, after flushing with argon, was charged with 60 ml of n-heptane and 67 ml of tetra-n-butoxytitanium. While keeping the inner temperature of the flask at 45° C., a solution of ethylaluminum sesquichloride (44.8 ml) in n-heptane (108 ml) was slowly added dropwise from the dropping funnel over 3 hours. Then the mixture was heated to 60° C., stirred for 1 hour, then left standing at room temperature, and subjected to solid-liquid separation. The separated solid was washed four times with 100 ml of n-heptane, and dried under reduced pressure, to give 38 g of a red-brown solid product. Titanium and n-butoxy group contents per 1 g of this solid product were 5.2 mmoles and 6.3 mmoles, respectively.

No peak characteristic of titanium trichloride crystal was observed in the X-ray (Cu-K$\alpha$) diffraction pattern of the solid product, proving the amorphous structure thereof.

(B) Preparation of preliminary polymerization treated solid

A 300-ml flask equipped with a stirrer, after flushing with argon, was charged with 241 ml of n-heptane, 0.34 g of triethylaluminum, and 24.1 g of a portion of the solid product prepared in (A) above. While stirring the suspension at 50° C., ethylene was slowly fed thereto during 20 minutes with the partial pressure being maintained at 0.2 Kg/cm$^2$G, to accomplish the preliminary polymerization treatment. Then the solid was separated from the liquid, washed twice with 50 ml of n-heptane, and dried under reduced pressure to give 26.5 g of a preliminary polymerization treated solid. The amount of ethylene polymerized was 0.1 g per 1 g of the solid product used.

(C) Preparation of solid catalyst component

A 100-ml flask, flushed with argon, was charged with 10.5 g of a portion of the preliminary polymerization treated solid prepared in (B) above, and 40.5 ml of n-heptane. While keeping the inner temperature of the flask at 30° C., 9.3 ml of diisoamyl ether was added to react with the solid. After conducting the reaction at 30° C. for 1 hour, the temperature was raised to 75° C. and 8.5 ml of titanium tetrachloride was added to react with the solid. The reaction was continued at 75° C. for 1 hour. The resulting mixture was left standing at room temperature, and subjected to solid-liquid separation. The separated solid was washed four times with 50 ml of n-heptane, and dried under reduced pressure to give a solid catalyst component.

Titanium and n-butoxy group contents per 1 g of this solid catalyst component were 5.0 mmoles and 0.27 mmole, respectively.

This solid catalyst component was good in particle characteristics. None of too fine particles and large aggregates were observed therein.

(D) Polymerization of propylene

A 130-ml stainless steel autoclave equipped with a magnetic stirrer, after flushing with argon, was charged with 250 mg of diethylaluminum chloride, 12.4 mg of a portion of the solid catalyst component prepared in (C) above, and 80 ml of liquified propylene.

The inner temperature of the autoclave was kept at 60° C. for 1 hour with stirring. The excess of propylen was discharged. The remaining product was air-dried for overnight to yield 16.9 g of a polypropylene.

Accordingly, the polypropylene yield (g) per 1 g of the solid catalyst component (hereinafter this yield is abbreviated as PP/cat) was 1360 (PP/cat=1360).

The percentage of the polymer remaining after 6 hours' extraction of the obtained polypropylene powder with boiling n-heptane (hereinafter this percentage is abbreviated as IY(%)) was 96.8% (IY=96.8%).

Particle size distribution of the obtained polypropylene powder is shown in Table 1. The content of fine particles less than 105$\mu$ in particle diameter was extremely low (0.14 wt %) and none of blocks larger than 1000$\mu$ in particle diameter were observed. Thus the polypropylene was good in particle characteristics.

TABLE 1

| | Particle size distribution of polypropylene powder | | | | | | | | |
|---|---|---|---|---|---|---|---|---|---|
| | Smaller than 105$\mu$ | 105$\mu \leq$ D < 149$\mu$ | 149$\mu \leq$ D < 250$\mu$ | 250$\mu \leq$ D < 297$\mu$ | 297$\mu \leq$ D < 350$\mu$ | 350$\mu \leq$ D < 420$\mu$ | 420$\mu \leq$ D < 590$\mu$ | 590$\mu \leq$ D < 710$\mu$ | 710$\mu \leq$ D < 1000$\mu$ | Larger than 1000$\mu$ |
| Example 1 | 0.14% | 0.19% | 2.3% | 29.6% | 52.7% | 12.7% | 1.9% | 0.4% | 0 | 0 |
| Comparative Example 1 | 6.7% | 7.1% | 18.2% | 15.5% | 25.5% | 14.8% | 6.1% | 1.4% | 1.3% | 3.4% |

(Note)
D: Particle size of polypropylene powder

COMPARATIVE EXAMPLE 1

A 100-ml flask, flushed with argon, was charged with 9.6 g of a portion of the solid product prepared in (A) of Example 1 and 36.9 ml of n-heptane. While keeping the inner temperature of the flask at 30° C., 8.6 ml of diisoamyl ether was added to treat the solid. After treatment at 30° C. for 1 hour, the resulting mixture was heated to 75° C. Titanium tetrachloride (11.7 ml) was added and reacted for 1 hour at the same temperature. The resulting mixture was left standing at room temperature, and subjected to solid-liquid separation. The separated solid was washed four times with 50 ml of n-heptane, and dried under reduced pressure to give a solid catalyst component.

Titanium and n-butoxy group contents per 1 g of this solid catalyst component were 5.4 mmoles and 0.29 mmole, respectively.

Considerable amounts of too fine particles and of large aggregates were observed in this solid catalyst component.

Using 8.4 mg of this solid catalyst component, propylene was polymerized in the same manner as in (D) of Example 1. The results showed PP/cat=1260 and IY=96.1%.

Particle size distribution of the obtained polypropylene powder, as shown in Table 1, indicated that the powder contained 6.7% by weight of fine particles smaller than 105μ in diameter and 3.4% by weight of blocks larger than 1000μ in diameter.

EXAMPLE 2

A solid catalyst component was prepared in the same manner as in (A), (B), and (C) of Example 1 except that 7.0 ml of di-n-butyl ether was used in place of diisoamyl ether in (C).

Titanium and n-butoxy group contents per 1 g of this solid catalyst component were 4.9 mmoles and 0.35 mmole, respectively The solid catalyst component was good in particle characteristics: neither too fine particles nor large aggregates were observed therein Using 13.2 mg of this solid catalyst component, propylene was polymerized in the same manner as in (D) of Example 1. The results showed PP/cat=1000 and IY=96.2%. In the obtained polypropylene powder, the content of fine particles less than 105μ in diameter was as low as 0.05% by weight and no block larger than 1000μ in diameter was observed. Thus, this polypropylene was good in particle characteristics.

COMPARATIVE EXAMPLE 2

A solid catalyst component was prepared in the same manner as in Comparative Example 1 except that 7.9 ml of di-n-butyl ether was used in place of diisoamyl ether.

Titanium and n-butoxy group contents per 1 g of this solid catalyst component were 5.4 mmoles and 0.38 mmole, respectively. Considerable amounts of too fine particles and large aggregates were observed in this solid catalyst component.

Using 16.9 mg of this solid catalyst component, propylene was polymerized in the same manner as in (D) of Example 1. The results showed PP/cat=1110 and IY=96.1%.

The obtained polypropylene powder was found to contain 7.9% by weight of fine particles smaller than 105μ in diameter and 4.6% by weight of blocks larger than 1000μ in diameter.

EXAMPLE 3

(A) Preparation of solid product

A 500-ml flask equipped with a stirrer and with a dropping funnel, after flushing with argon, was charged with 83 ml of n-heptane, 16.1 ml of titanium tetrachloride, and 51.0 ml of tetra-n-butoxytitanium. While stirring the mixture at 20° C., a solution of diethylaluminum chloride (37.8 ml) in n-heptane (162.1 ml) was slowly added dropwise from the dropping funnel over 3 hours. Then, the mixture was heated to 50° C., stirred for 1 hour, then left standing at room temperature, and subjected to solid-liquid separation. The separated solid was washed four times with 200 ml of n-heptane, and dried under reduced pressure to give 64.7 g of a red-brown solid product.

Titanium and n-butoxy group contents per 1 g of this solid product were 5.3 mmoles and 4.8 mmoles, respectively.

No peak characteristic of titanium trichloride crystal was observed in the X-ray (Cu-Kα) diffraction pattern of the solid product, proving the amorphous structure thereof.

(B) Preparation of preliminary polymerization treated solid

A portion (19.7 g) of the solid product prepared in (A) above was subjected to preliminary ethylene polymerization treatment in the same manner as in (B) of Example 1. The amount of ethylene polymerized was 0.09 g per 1 g of the solid product.

(C) Preparation of solid catalyst component

A 100-ml flask, flushed with argon, was charged with 9.9 g of a portion of the preliminary polymerization treated solid prepared in (B) above and 38 ml of n-heptane. While keeping the inner temperature of the flask at 30° C., 8.5 ml of diisoamyl ether was added to treat the solid. After treatment at 30° C. for 1 hour, the mixture was heated to 80° C. and 11.5 ml of titanium tetrachloride was added to react with the solid. The reaction was continued at 80° C. for 1 hour. The resulting solid was separated from the liquid, washed four times with 50 ml of n-heptane, and dried under reduced pressure to give a solid catalyst component.

Titanium and n-butoxy group contents per 1 g of this solid catalyst component were 5.0 mmoles and 0.22 mmole, respectively.

This solid catalyst component was good in particle characteristics. None of too fine particles and large aggregates were observed therein.

(D) Polymerization of propylene

Using 14.5 mg of the solid catalyst component prepared in (C) above, propylene was polymerized in the same manner as in (D) of Example 1. The results showed PP/cat=1610 and IY=98.2%. In the obtained polypropylene powder, the content of fine particles less than 105μ in diameter was as low as 0.08% by weight and no block larger than 1000μ in diameter was observed.

EXAMPLE 4

A 100-ml flask, flushed with argon, was charged with 12.1 g of a portion of the preliminary polymerization treated solid prepared in (C) of Example 1 and 42.3 ml of n-heptane. While keeping the inner temperature of the flask at 30° C., 14.4 ml of diisoamyl ether was added to treat the solid. After treatment at 30° C. for 1 hour, the mixture was heated to 75° C., and 15.7 ml of titanium tetrachloride was added to react with the solid. The reaction was continued at 75° C. for 1 hour. The resulting solid was separated from the liquid, washed four times with 50 ml of n-heptane, and dried under reduce pressure to give a solid catalyst component.

Titanium and n-botoxy group contents per 1 g of this solid catalyst component were 5.1 mmoles and 0.08 mmole, respectively.

This solid catalyst component was good in particle characteristics.

Using 14.1 mg of this solid catalyst component, propylene was polymerized in the same manner as in (D) of Example 1. The results showed PP/cat=1800 and IY=98.2%. In the obtained polypropylene powder, the content of fine particles smaller than 105μ in diameter was as low as 0.05% by weight and no block larger than 1000μ in diameter was observed.

EXAMPLE 5

A 100-ml flask, flushed with argon, was charged with 10.1 g of a preliminary polymerization treated solid prepared in the same manner as in (B) of Example 1 and 39.0 ml of n-heptane. While keeping the inner temperature of the flask at 30° C., 9.6 ml of diisoamyl ether and 0.2 ml of tri-n-octylamine were added to treat the solid. After treatment at 30° C. for 1 hour, the temperature was raised to 75° C., and 12.8 ml of titanium tetrachloride was added to react with the solid. The reaction was continued at 75° C. for 1 hour. The resulting solid was separated from the liquid, washed four times with 50 ml of n-heptane, and dried under reduced pressure to give a solid catalyst component.

Titanium and n-butoxy group contents per 1 g of this solid catalyst component were 4.9 mmoles and 0.26 mmole, respectively. This solid catalyst component was found to have good particle characteristics.

Using 13.9 mg of this solid catalyst component, propylene was polymerized in the same manner as in (D) of Example 1.

The results showed PP/cat=1400 and IY=96.3%. In the obtained polypropylene powder, the content of fine particles smaller than 105μ in diameter was as low as 0.20% by weight and no block larger than 1000μ in diameter was observed.

EXAMPLE 6

(A) Preparation of solid product

A 300-ml flask equipped with a stirrer and with a dropping funnel, after flushing with argon, was charged with 15 ml of toluene and 15 ml of titanium tetrachloride. While keeping the inner temperature of the flask at 80° C., a mixture comprising 40 ml of toluene and 28.7 ml of o-cresol was slowly added dropwise from the dropping funnel over 1 hour. Thereafter, the resulting mixture was further stirred at 80° C. for 1.5 hours.

The inner temperature of the flask was lowered to 20° C. and then a solution of diethylaluminum chloride (17 ml) in n-heptane (40 ml) was slowly added dropwise from the dropping funnel over 2 hours while keeping the temperature at 20° C. Thereafter, the resulting mixture was further stirred for 1 hour, and left standing at room temperature to separate into solid and liquid. The separated solid was washed 6 times with 100 ml of n-heptane, and dried under reduced pressure to give a brown solid product.

Titanium and o-cresyloxy group contents per 1 g of this solid product were 4.3 mmoles and 3.9 mmoles, respectively.

No peak characteristic of titanium trichloride crystal was observed in the X-ray (Cu-Kα) diffraction pattern of this solid product, proving the amorphous structure thereof.

(B) Preparation of preliminary polymerization treated solid

Using 18.3 g of the solid product obtained in (A) above, a preliminary polymerization treated solid was prepared in the same manner as in (B) of Example 1. The amount of ethylene polymerized was 0.2 g per 1 g of the solid product used.

(C) Preparation of solid catalyst component

A 100-ml flask, flushed with argon, was charged with 7.6 g of a portion of the preliminary polymerization treated solid prepared in (B) above and 29.2 ml of n-heptane. While keeping the inner temperature of the flask at 30° C., 5.7 ml of diisoamyl ether was added to treat the solid. After treatment at 30° C. for 1 hour, the temperature was raised to 75° C., and 7.7 ml of titanium tetrachloride was added to react with the solid. The reaction was continued at 75° C. for 1 hour. Then, the resulting solid was separated from the liquid, washed four times with 50 ml of n-heptane, and dried under reduced pressure to give a solid catalyst component.

Titanium and o-cresyloxy group contents per 1 g of this solid catalyst component were 3.4 mmoles and 0.14 mmole, respectively.

This solid catalyst component was found to have good particle characteristics.

(D) Polymerization of propylene

Using 14.5 mg of the solid catalyst component prepared in (C) above, propylene was polymerized in the same manner as in (D) of Example 1. The results showed PP/cat=870 and IY=96.9%. The obtained polypropylene powder was good in particle characteristics; the content of fine particles smaller than 149μ in diameter was as low as 0.1% by weight and no block larger than 1000μ in diameter was observed.

EXAMPLE 7

Polymerization in liquefied propylene

A 1-liter stainless steel autoclave equipped with a stirrer, after flushing with argon, was charged with 1.5 g of diethylaluminum chloride, 29.5 mg of a portion of the solid catalyst component prepared in Example 4, and then with hydrogen in an amount corresponding to a partial pressure of 0.6 Kg/cm$^2$G and further with 280 g of liquefied propylene. The temperature of autoclave was raised to 65° C., and polymerization of propylene was continued at 65° C. for 2 hours. Thereafter, the unreacted monomer was purged, and the formed polymer was dried under reduced pressure at 60° C. for 2 hours to give 147.6 g of a polypropylene powder. Accordingly, PP/cat was 5000. The proportion of the atactic component soluble in cold xylene was 1.7% by weight of the total yielded polymer. The obtained polypropylene powder containing no coarse or fine particles was good in particle characteristics.

EXAMPLE 8

Random copolymerization of ethylene and propylene

A 5-liter stainless steel autoclave equipped with a stirrer, after flushing with argon, was charged with 1.5 l of dry n-heptane and 6.0 mg of ε-caprolactone. Succeedingly, hydrogen and ethylene were added in amounts corresponding to partial pressures of 0.20 and 0.095 Kg/cm$^2$G, respectively. The temperature of autoclave was raised to 60° C. Propylene was fed into the autoclave to a total pressure of 4 Kg/cm$^2$G, and then 1.5 g of diethylaluminum chloride and 132.7 mg of a portion of the solid catalyst component prepared in Example 4 were added to initiate polymerization. The polymerization was continued for 4 hours while keeping the total pressure at 4 Kg/cm$^2$G by supplying an ethylene-propylene mixed gas containing 6.5% by volume of ethylene. Thereafter, the introduction of the mixed gas was stopped and the unreacted monomers were purged. The formed copolymer was filtered on a Büchner funnel, and dried at 60° C. to give 359 g of an ethylene-propylene copolymer powder. The filtrate was evaporated to remove n-heptane to give 7.9 g of an amorphous polymer. Accordingly, the heptane-insoluble polymer content (HIP) was 97.8%. The copolymer yield per 1 g of the solid catalyst component (PP/cat)

was 2760. Infrared absorption spectroscopy indicated that 3.6% by weight of ethylene was contained in the copolymer. The proportion of the atactic component soluble in cold xylene was 4.0% by weight of the total copolymer powder.

EXAMPLE 9

Block copolymerization of ethylene and propylene

A 5-liter stainless steel autoclave equipped with a stirrer, after flushing with argon, was charged with 98.8 mg of a portion of the solid catalyst component prepared in (C) of Example 1 and 3.0 g of diethylaluminum chloride. Then, hydrogen gas was added in an amount corresponding to a partial pressure of 0.79 Kg/cm$^2$G. Subsequently 1.3 Kg of propylene was forced into the autoclave to be polymerized. The polymerization was continued for 1 hour while keeping the autoclave temperature at 60° C.

Thereafter, the unreacted monomer was purged, and the gas in the autoclave was replaced again with argon. While keeping the temperature at 60° C., hydrogen in an amount corresponding to a partial pressure of 0.15 Kg/cm$^2$G was added, propylene gas was fed to a total pressure of 8.0 Kg/cm$^2$G, and ethylene gas to a total pressure of 10 Kg/cm$^2$G, to start gas phase copolymerization.

The gas phase copolymerization of ethylene and propylene was continued for 3.0 hours while supplying a 50:50 vol % ethylene-propylene mixed gas so as to maintain the total pressure of 10 Kg/cm$^2$G.

Then, the unreacted monomer was purged to give 465 g of a propylene-ethylene block copolymer, free of fine and coarse particles, good in particle characteristics.

This block copolymer was found to contain 63% by weight of propylene homopolymer and 37% by weight of propylene-ethylene copolymer.

COMPARATIVE EXAMPLE 3

(A) Preparation of solid catalyst component

A 300-ml flask was flushed with argon. Then, 70 ml of n-heptane and n-butoxytitanium trichloride (100 mmoles, prepared by mixing 75 mmoles of TiCl$_4$ and 25 mmoles of Ti(OBu)$_4$) were placed in the flask. While stirring the mixture at 30° C., 50 mmoles of n-butyl ether was added dropwise. Then diethylaluminum chloride (95 mmoles, in toluene at a concentration of 1 mole/l) was added dropwise at 60° C. over 1 hour. The formed precipitate was filtered, washed three times with 100 ml of n-heptane, and dried under reduced pressure to give 17 g of a red-brown solid.

Then, 8.1 g of a portion of this solid together with 20.3 mmoles of titanium tetrachloride, 20.3 ml of toluene, and 20.3 mmoles of di-n-butyl ether was charged into a 100-ml flask which had been flushed with argon, and was dissolved with stirring at 60° C. for 1 hour to form a black-brown liquid. This liquid was further stirred at 100° C. for 4 hours to allow reaction to proceed. Filtration of the thus formed precipitate was tried by using a G-3 glass filter but was impossible because of heavy clogging of the filter. Therefore a dip tube was used to separate the solid from the liquid. The separated solid was washed four times with 50 ml of n-heptane, and dried under reduced pressure to give 6.3 g of a solid catalyst component.

(B) Polymerization of propylene

Using 20.6 mg of the solid catalyst component prepared in (A) above, propylene was polymerized in the same manner as in (D) of Example 1. The results showed PP/cat=450 and IY=97.1%.

The obtained polypropylene powder was found to contain 37.0% by weight of fine particles smaller than 105μ in diameter and 1.8% by weight of blocks larger than 1000μ in diameter.

EXAMPLE 10

Polymerization of propylene

A 5-liter stainless steel autoclave equipped with a stirrer, after flushing with argon, was charged with 1.5 l of dry n-heptane, 1.5 g of diethylaluminum chloride, 105.8 mg of a solid catalyst component prepared in the same manner as in Example 4, and 29.7 mg of ε-caprolactone, and subsequently with hydrogen in an amount corresponding to a partial pressure of 0.395 Kg/cm$^2$G and further with 130 g of liquefied propylene to polymerize propylene. The polymerization was conducted at 60° C. for 4 hours while supplying propylene gas so as to keep a total pressure of 6 Kg/cm$^2$G. Then, the introduction of propylene gas was stopped, and the unreacted monomer was purged. The resulting polymer was filtered on a Büchner funnel, and dried at 60° C. to yield 250.9 g of a polypropylene powder. The filtrate was evaporated to remove n-heptane, to give 2.0 g of an amorphous polymer.

Accordingly, the HIP was 99.2%. The PP/cat was 2390. The proportion of the atactic component soluble in cold xylene was 1.1% by weight of the polymer powder. The obtained polypropylene powder was free of fine and coarse particles, thus being good in particle characteristics.

EXAMPLE 11

Polymerization of propylene

Propylene was polymerized in the same manner as in Example 10 except that no ε-caprolactone was added. The results showed PP/cat=2480 and HIP=98.9%. The proportion of the atactic component soluble in cold xylene was 2.0% by weight. The obtained polypropylene powder was free of fine and coarse particles, good in particle characteristics.

What is claimed is:

1. A process for producing an olefin polymer which comprises homopolymerizing or copolymerizing an olefin in the presence of a catalyst system composed of an organoaluminum compound and a hydrocarbyloxy group-containing solid catalyst component which is prepared by reducing a titanium compound represented by the general formula Ti(OR$^1$)$_n$X$_{4-n}$, wherein R$^1$ is a C$_1$-C$_{20}$ hydrocarbon radical, X is halogen, and n is a number defined as $0 < n \leq 4$, with an organoaluminum compound represented by the general formula AlR$^2{}_m$Y$_{3-m}$, wherein R$^2$ is a C$_1$-C$_{20}$ hydrocarbon radical, Y is halogen, and m is a number of defined as $1 \leq m \leq 3$, subjecting the reduction product, which is a hydrocarbyloxy group-containing solid insoluble in hydrocarbon solvents and in which the hydrocarbyloxy group content is 0.3 to 2.5 moles per mole of titanium atoms, to a preliminary ethylene polymerization treatment, and treating the resultant solid in a state of slurry is a hydrocarbon solvent with an ether compound and titanium tetrachloride at a temperature of 30° to 100° C.

2. The process according to claim 1, wherein n of the titanium compound represented by the general formula Ti(OR$^1$)$_n$X$_{4-n}$ is a number defined as $1 \leq n \leq 4$.

3. The process according to claim 1, wherein X of the titanium compound represented by the general formula Ti(OR$^1$)$_n$X$_{4-n}$ is chlorine.

4. The process according to claim 1, wherein the hydrocarbon radical R$^1$ is a linear alkyl group of 2 to 18 carbon atoms and/or aryl groups of 6 to 18 carbon atoms.

5. The process according to claim 1, wherein the ether compound is a dialkyl ether.

6. The process according to claim 1, wherein the amount of the ether compound used for the treatment of the preliminary polymerization treated solid is from 0.1 to 5 moles per mole of titanium atoms contained in the solid.

7. The process according to claim 1, wherein the amount of titanium tetrachloride used for the treatment of the preliminary polymerization treated solid is form 0.1 to 10 moles per mole of titanium atoms contained in the solid.

8. The process according to claim 1, wherein the amount of hydrocarbyloxy groups in the solid catalyst component is from $5 \times 10^{-4}$ to $2 \times 10^{-1}$ mole per mole of titanium atoms contained in the solid catalyst component.

9. The process according to claim 1, wherein the amount of ethylene preliminarily polymerized is from 0.03 to 10 g per 1 g of the hydrocarbyloxy group-containing solid reduction product.

* * * * *